(12) United States Patent
Lilien et al.

(10) Patent No.: US 9,998,729 B2
(45) Date of Patent: Jun. 12, 2018

(54) METHOD AND SYSTEM FOR THREE DIMENSIONAL IMAGING AND ANALYSIS

(71) Applicant: CADRE RESEARCH LABS, LLC, Chicago, IL (US)

(72) Inventors: Ryan Lilien, Chicago, IL (US); Marcus Brubaker, Toronto (CA); Pierre Duez, Toronto (CA)

(73) Assignee: Ryan Lilien, Chicago, IL (US)

(*) Notice: Subject to any disclaimer, the term of this patent is extended or adjusted under 35 U.S.C. 154(b) by 167 days.

(21) Appl. No.: 14/569,080

(22) Filed: Dec. 12, 2014

(65) Prior Publication Data

US 2016/0171746 A1    Jun. 16, 2016

(51) Int. Cl.
*H04N 13/02*    (2006.01)
*G01B 11/24*    (2006.01)
*F42B 35/00*    (2006.01)
*G01B 5/00*    (2006.01)

(52) U.S. Cl.
CPC ......... *H04N 13/0207* (2013.01); *F42B 35/00* (2013.01); *G01B 5/0004* (2013.01); *G01B 11/24* (2013.01)

(58) Field of Classification Search
CPC .................................................. H04N 13/0207
See application file for complete search history.

(56) References Cited

U.S. PATENT DOCUMENTS

| | | | |
|---|---|---|---|
| 7,822,263 B1* | 10/2010 | Prokoski | F42B 35/00 382/152 |
| 2014/0208578 A1* | 7/2014 | Linderman | A61B 17/155 29/592 |
| 2014/0253717 A1* | 9/2014 | Adelson | H04N 7/183 348/88 |

* cited by examiner

*Primary Examiner* — Tracy Y Li

(57) ABSTRACT

The inventive systems and methods relate to the field of matching toolmarks for firearm forensics having a retrographic sensor to provide a three dimensional representation of a surface of an object for heatmapping analyzed matching geometric features.

8 Claims, 9 Drawing Sheets

$$H(x,y) = \begin{bmatrix} \dfrac{\partial^2 I_{x,y}}{\partial x^2} & \dfrac{\partial^2 I_{x,y}}{\partial x \partial y} \\ \dfrac{\partial^2 I_{x,y}}{\partial y \partial x} & \dfrac{\partial^2 I_{x,y}}{\partial y^2} \end{bmatrix}$$

METHOD AND SYSTEM FOR THREE DIMENSIONAL IMAGING AND ANALYSIS

BACKGROUND

Cartridge case comparison is based on the observation that microscopic firearm imperfections (such as those on a breech-face) can be transferred to a fired casing. The ability to certify two casings as highly similar is therefore a function of both the ability to capture a high-resolution three dimensional measurement of each casing and the ability to identify and match relevant structural features between two casings.

For over 90 years, firearm induced toolmarks have been manually compared using light-microscopy. This approach is time consuming and lacks an interpretable quantitative measure of similarity resulting in an increasing number of courtroom admissibility challenges. With this manual approach, expert examiners would typically consider micron-scale geometry toolmarks for qualitative comparisons, but due physical limitations, quantitative measurements of the toolmark dimensions were unpractical at the micron-scale.

Initial commercial systems, introduced in the 1980s and 90s, combined traditional 2D light microscopy with a digital camera and software for image comparison and database search. When the system is used in a database search, an image of the query object is compared to a stored library of previously collected images. Hits are ranked by match score, and presented in a rank list. A forensics expert sequentially considers each match and when possible, may take both pieces of evidence to a light microscope for manual comparison and confirmation. Unfortunately, current 2D systems suffer from several disadvantages that often result in low match accuracy due to image quality and correlation accuracy which are significantly affected by lighting conditions. Surface features visible under one lighting condition may be virtually invisible with a small lighting change. A further limitation of the traditional 2D methods is the sole reliance on length and width parameters of the toolmarks. This approach omits important geometric height data from consideration.

Researchers are now exploring second generation technology capable of capturing three-dimensional images of toolmarks. Several technologies have been considered, including: focus-variation microscopy, confocal microscopy, point laser profilometry, and scanning interferometry.

The listed techniques introduce crucial geometric height parameters that increase accuracy and consistency over traditional manual and 2D methods of analysis. Focus-variation and confocal microscopy derive geometric height information based on the focal plane of the detector. Point laser profilometry and scanning interferometry determine geometric height variations based on interference patterns created along the optical path of a detector.

Of these, confocal microscopy and focus-variation microscopy were recently identified as the most promising. However, the nature of confocal microscopy presents limitations when dealing with steep slopes, artifacts of surface reflectivity, acquisition speed, and cost. While only a small number of labs may be able to afford confocal-based 3D imaging machines, there are many laboratories and research facilities that would benefit from a lower-cost three-dimensional imaging solution.

The current state of cartridge case comparison also suffers in common methods of analyzing casings. One common method is to determine a cross-correlation between the corresponding pixel values of two casing images. The underlying assumption is that once two images are normalized, they should contain the same structural features and thus similar pixel values. Current cross-correlation based determinations suffer from a few shortcomings.

First and most importantly, non-informative features can adversely affect the match score. The entire breech-face is noisy and contains both informative and non-informative structural features. That is, while some of the structural features are similar between the two surfaces, other features are not; because the cross-correlation typically considers the entire masked surface, both informative and non-informative regions are compared and the quality of the match can be negatively affected.

Second, the multiple pre-processing steps have the potential to eliminate relevant information in each image.

Finally, imaging artifacts and shadows can adversely affect the match score. Researchers at NIST recently extended the cross-correlation method into their Contiguous Matching Cells (CMC) approach. The CMC method divides the measured surface into a series of patches (or cells) and compares each independently. This reduces the influence of non-matching regions when comparing two surfaces and performs better than straight cross-correlation based methods.

It is worth noting that 2D image comparison algorithms have been known to incur problems in translating to the comparison of 3D images.

To further complicate the error prone approach, existing approaches to providing match analysis simply provide a match score and do not localize the specific features identified as a basis for the score. As a result this "black box" approach raises issues concerning the arbitrary nature of the score and doubt as to the overall reliability.

A method to visually present the basis of the match score as well as providing real-time light manipulation is needed in the art as a tool to aid forensics experts to provide reliable and consistent analysis of micron scale toolmarks.

Another problematic issue facing the current field of forensic analysis is an inability to reproduce lighting conditions during manual analysis. Furthermore, it is not feasible for forensic experts to be able to manipulate light positioning at micron level resolution. This substantially decreases the accuracy and consistency of casing matches between forensic experts as various lighting conditions produce different shading patterns that result in the interpretation of conflicting features, particularly at the micron level. Furthermore, issues arise with the difficulties in reproducing the analytical basis for match opinions. The field is in need of a tool that would provide a precise method of light manipulation at micron level resolution that can objectively track precise lighting parameters that can be reported and applied with reproducible accuracy.

Several recent reports, including two from the National Academy of Sciences, have called for additional research, development of new instrumentation and inventive methods to address the identified challenges and to usher in the next generation of forensic analysis.

SUMMARY

The inventive systems and methods overcome the identified issues in the current field of the art.

One embodiment comprises a system of matching toolmarks for firearm forensics having a sensor to provide a three dimensional representation of a surface of an object, a holder to hold the object and depress the object into the sensor in a specified orientation, a multidirectional light-source to provide lighting, an image capture device to record the three dimensional image; and a computer in communication with the image capture device to store and analyze the recorded three dimensional image data.

In one embodiment, the object is a cartridge casing.

In another embodiment, the holder holds the cartridge casing in a specified orientation such that the base of casing is depressed into the sensor. In another embodiment, the holder holds the cartridge casing in a specified orientation such that the side of the casing is depressed into the sensor. In another embodiment, the holder is removable. In another embodiment, the removable holder is dimensioned for a specific caliber cartridge casing. In another embodiment the system has a plurality of removable holders each of which are dimensioned for a specific caliber cartridge casing. In yet another embodiment, the caliber cartridge casing ranges from a .22 short to a .45 auto or from a .45 auto to a .308 winchester. In one embodiment, the holder is actuated by manual levers to hold and depress the object into the sensor. In another embodiment, the holder is actuated automatically to hold and depress the object into the sensor.

In one embodiment, the holder is a fitting element having a plurality of fingers that are manipulated to grasp an object of interest. In one embodiment, a single fitting element supports the dimensions of cartridge casings ranging from a .22 short to a .45 auto or from a .45 auto to a .308 winchester. In one embodiment, the fitting element has three radially positioned fingers or jaws. In one embodiment, the fitting element has five radially positioned fingers. In another embodiment, the fitting element has six radially positioned fingers. In one embodiment the fitting element has two adjustable jaws that grab the casing in the extractor groove. In one embodiment, the fitting element has an even number of fingers that are radially positioned. In another embodiment, the fitting element has an even number fingers that are not radially positioned wherein each finger has a diametrically opposing finger. In one embodiment, the fitting element has an odd number of fingers that are radially positioned and disposed equiangularly. In one embodiment, the fingers are tipped with frictional material. In one embodiment, the frictional material is rubber. In another embodiment, the frictional material is nylon.

In one embodiment, the image capture device provides images at a resolution ranging from about 0.5 microns per pixel to about 10.0 microns per pixel.

In another embodiment, a glass plate provides a mounting base for the sensor and provides a light transmission medium to the multidirectional light-source disposed along the edges of the glass plate.

In one embodiment, a three dimensional printer in communication with the computer to print the recorded three dimensional image.

In another embodiment, the system has a virtual light manipulation element as part of the computer interface to mimic manual real time light positioning on the recorded three dimensional surface. In one embodiment, the light manipulation element is part of the computer interface. In another embodiment, the light manipulation element is a physical trackball in communication with the computer, or any other similar physical element capable of communicating with a computer such as a computer mouse, track pad, a computer stylus, and other physical devices known in the art.

One embodiment comprises a method of matching toolmarks for firearm forensics having the steps of producing a three dimensional surface of an object with a retrographic sensor, illuminating the three dimensional surface with sequential multidirectional light, capturing at least one image at each sequential illumination of a surface, rendering the captured images into a three dimensional image, analyzing the three dimensional image for geometric features, comparing the geometric features to known geometric features and providing evaluation of the comparison between the geometric features and known geometric features.

In one embodiment, the object is a cartridge casing.

In one embodiment, the surface is a breech face surface.

In one embodiment, the analyzing step is performed by a computer. In another embodiment the analyzed geometric features have continuously variable slope.

In one embodiment, the method has a step of heatmapping the three dimensional image based on the comparison evaluation. In another embodiment, the heatmapping comprises coloring each substantially similar geometric feature. In coloring each substantially similar geometric feature, some regions having a substantial amount of similar geometric features will appear to be darker than other regions that have less or no substantially similar geometric features.

In one embodiment, the method has a step of 3D printing the three dimensional image. In another embodiment, the method includes a step of 3D printing the heatmapped three dimensional image.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Imaging and Analysis System

Figure 1:
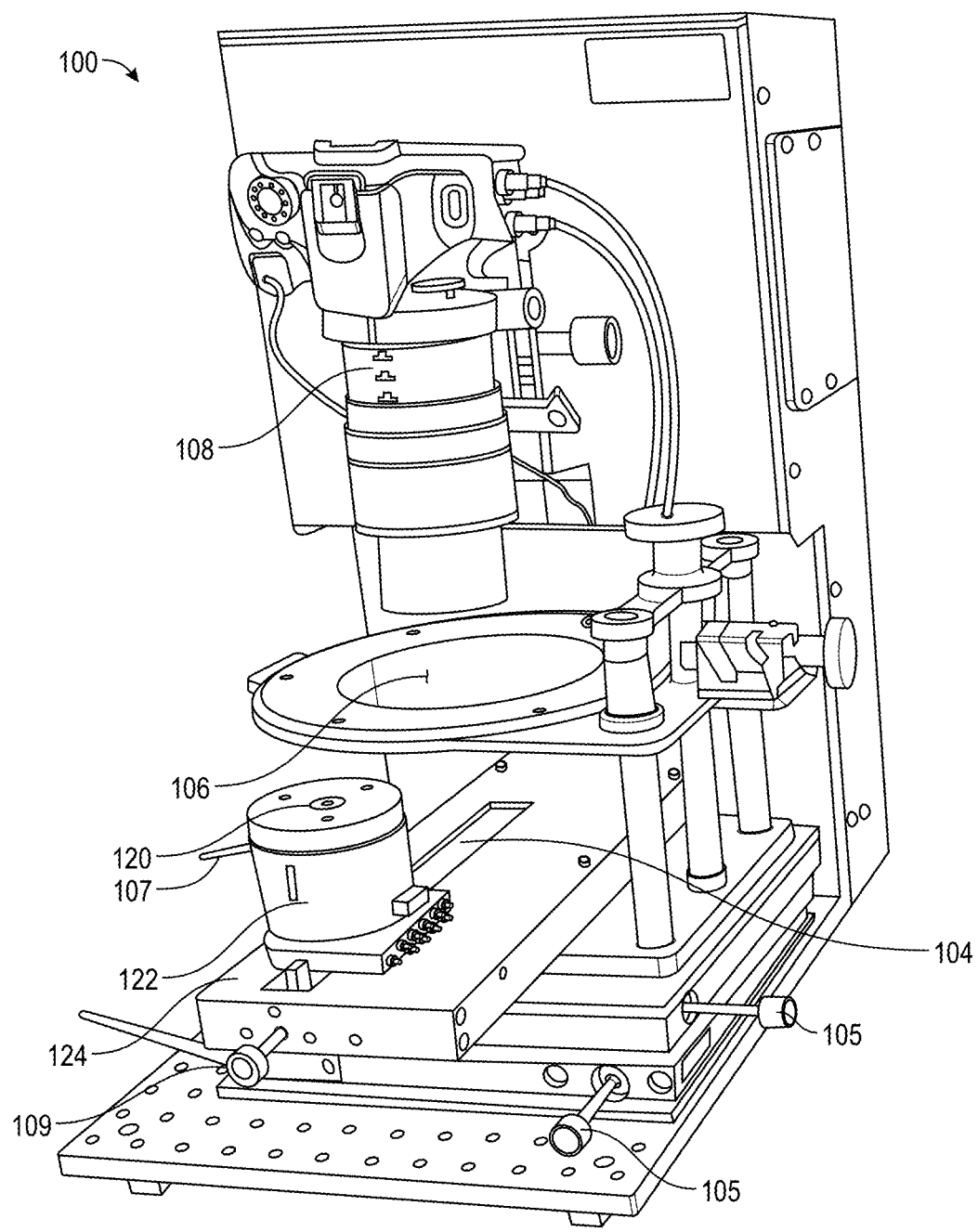
FIG. 1 illustrates one embodiment of the imaging and analysis system.

In one embodiment, the system involves two stages: (1) scan acquisition; and (2) scan comparison. In one embodiment, the scan acquisition step utilizes retrographic sensing techniques as described in pending U.S. patent application Ser. No. 13/561,712, which is incorporated by reference in its entirety. Scan Comparison involves custom feature-based surface comparison inventive methods which focus on the most informative regions of the casing's surface. The system also includes visualization, database, and search software. In one embodiment as shown in FIG. 1, the system 100 captures surface topographies ranging from a resolution ranging from about 0.5 microns per pixel to 10 microns per pixel In a preferred embodiment, the system captures surface topographies at a resolution ranging from about 0.9 to about 1.5 microns per pixel. In particular embodiments, the system captures surface topographies at a resolution of 0.9, 1.0, 1.1, 1.2, 1.3, 1.4 or 1.5 microns per pixel. In one specific embodiment, the system captures surface topographies captures surface topographies at a resolution of 1.35 microns per pixel.

Scan Acquisition Hardware

Figure 2:
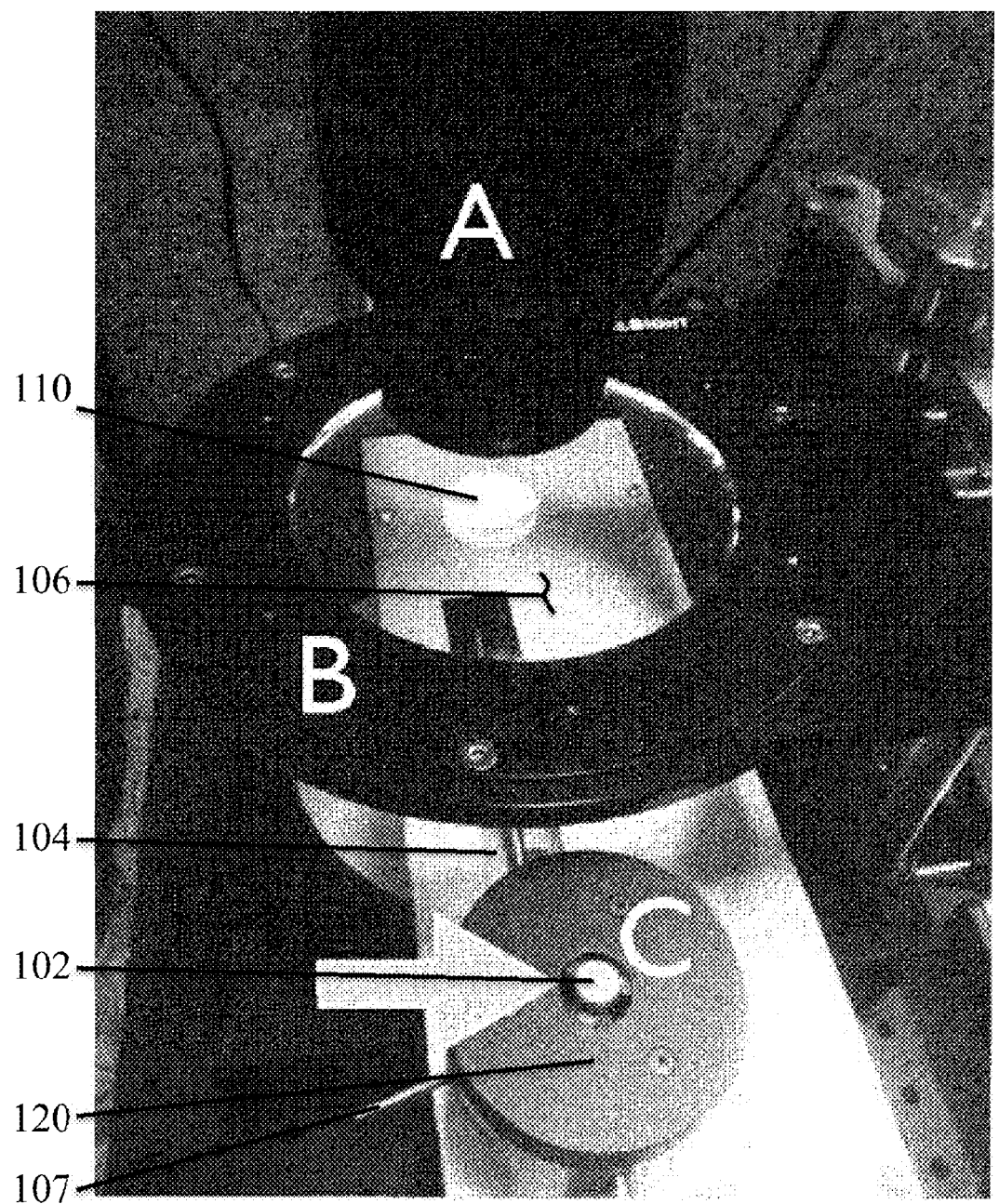
FIG. 2 illustrates the sensor and mounting components of one embodiment of the imaging and analysis system.
Figure 3:
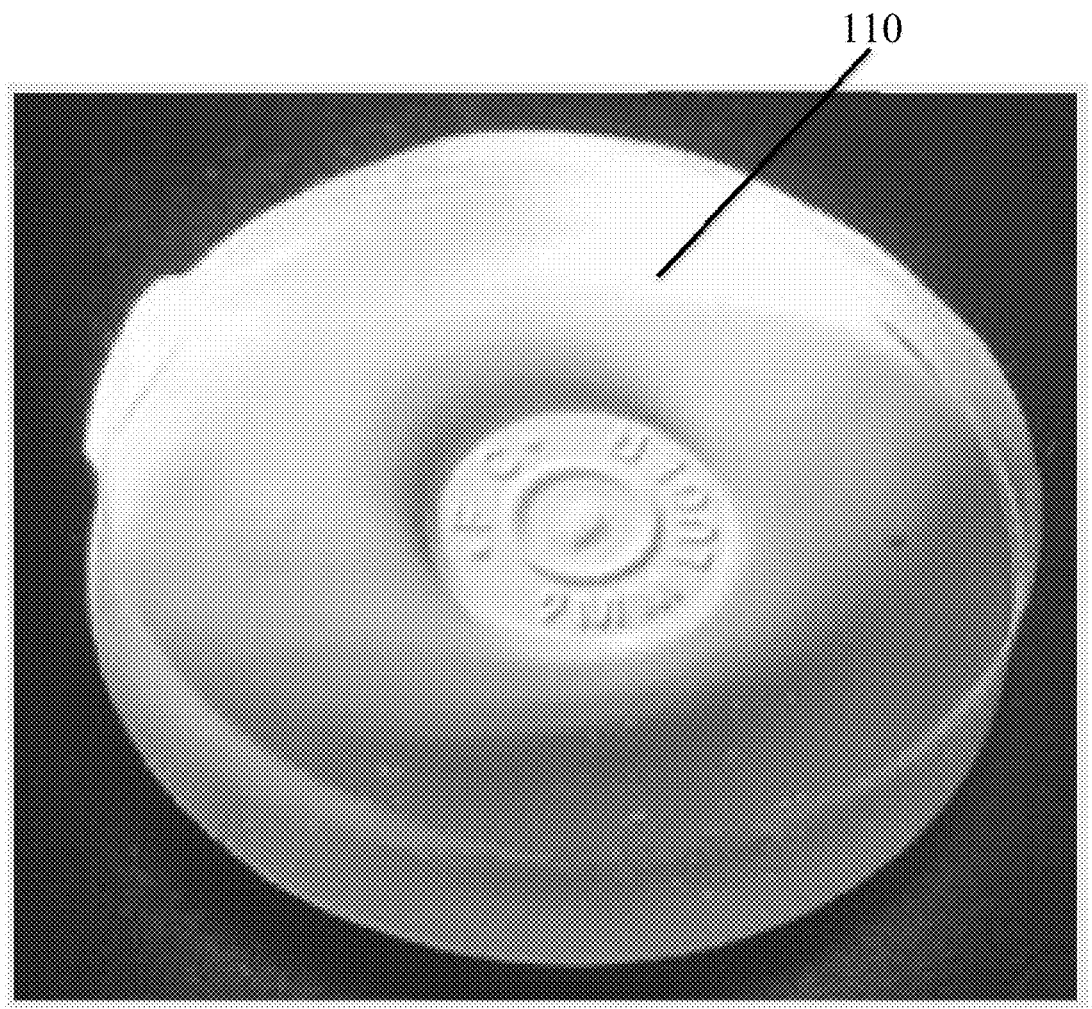
FIG. 3 illustrates an example image provided by the sensor in one embodiment of the imaging and analysis system.

In one embodiment, the system utilizes advanced three-dimensional imaging inventive methods (e.g., shape from shading and photometric stereo) and the retrographic sensor of Johnson and Adelson [1] to measure an object's three dimensional surface topography. In one embodiment the retrographic sensor 110 is a block of optically clear elastomer with a thin layer of elastic paint or pigment on one side. In one embodiment as shown in FIGS. 1 and 2, an object 102, such as a cartridge casing, is disposed in a holder 120 which is slid along track 104 to be positioned under the sensor 110 and then raised into sensor 110. The casing 102 is pressed into the sensor 110 having a layer of pigment wherein the control software on an attached computer activates panels of directional lighting along the edge of glass plate 106 to collect a plurality of images with camera 108. The layer of pigment on the sensor 110 conforms to the shape of the surface as shown in FIG. 3. In one embodiment, the layer of pigment removes the influence of the optical properties of the surface on shape estimation. Every material, such as glass, metal, plastic, or human skin, appears the same when pressed into the retrographic sensor. In contrast to confocal microscopy and focus-variation microscopy, this embodiment of the system removes the influence of surface reflectivity on the measured topography.

In one embodiment, the system is able to measure micron-scale geometry (sub-micron depth resolution and lateral (xy) resolution of approximately 1 μm/pixel). Although firearms examiners typically consider tool marks ranging from tens to hundreds of microns in diameter, they do occasionally consider features as small as 10-15 μm but typically do not due to the practical infeasibility of manual human analysis. The resolution of the inventive system is capable of capturing and representing these small marks.

In one embodiment as shown in FIG. 2, the sensor 110 is mounted on a sheet of glass 106 and a camera 108 views the reflective skin through the clear elastomeric sensor 110. In one embodiment, the holder 120 is structured to support the dimensions of an object of interest, for example cartridge casing. The mount 122, as shown in FIG. 2, includes a removable holder 120, which is also structured to support the dimensions of a cartridge casing of interest. In one embodiment, the mount 122 and removable holder 120 are on a sliding drawer mechanism 124, as shown in FIG. 1. In one embodiment, the removable holder 120 is structured to support the dimensions of a specific sized object, such as the cartridge calibers of cartridge casings. For example one removable holder is structured to support the dimensions of a 9 mm casings and can be replaced by another removable holder structured to support the dimensions of a .22 caliber casing, and so on.

Figure 5:
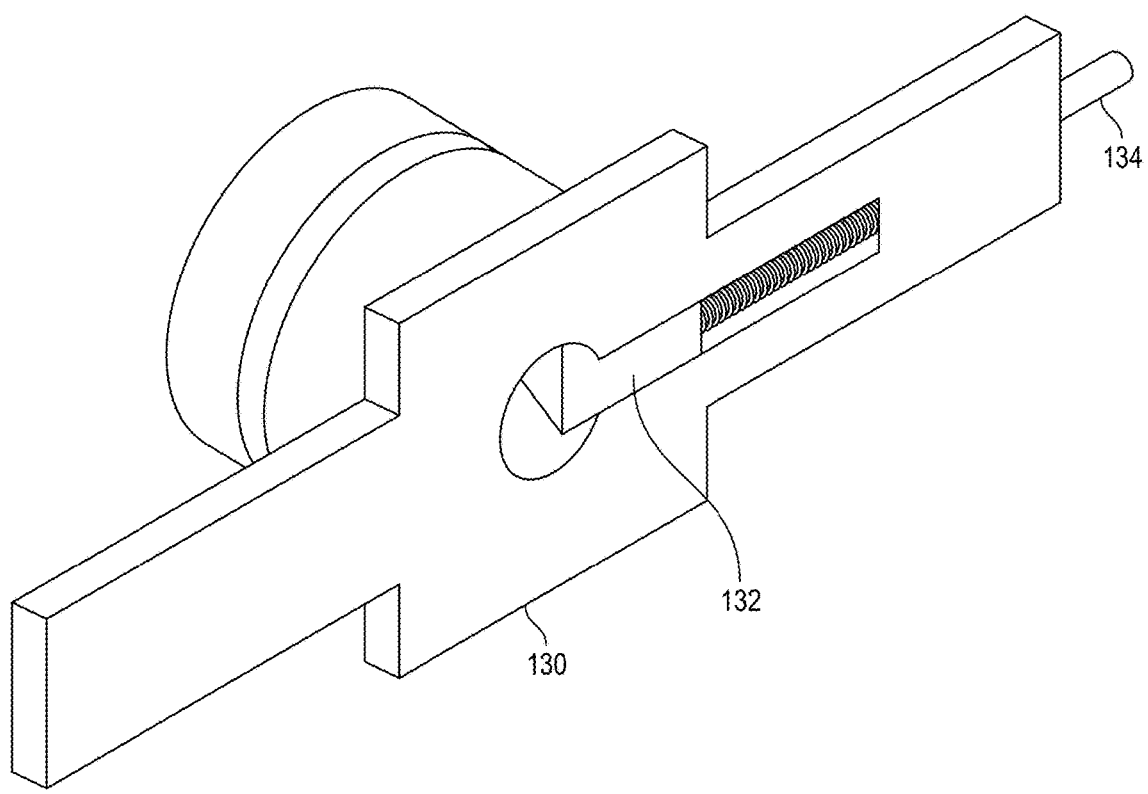
FIG. 5 illustrates an embodiment of an adjustable fitting element.

The system 100 is structured to support a range of cartridge calibers casings using an adjustable fitting element 130. For example, from a .22 short to a .45 auto or from a .45 auto to a .308 winchester. Other ranges are fully contemplated. In one embodiment, as shown in FIG. 5, the fitting element 130 has an adjustable holding block 132 and a holding lever 134 to adjust holding block 132. In one embodiment, fitting element 130 has two adjustable jaws that grab the casing in the extractor groove. In another embodiment, the fitting element 130 includes three radially positioned rubber tipped nylon fingers. The fingers may be tipped with alternative materials that share the same mechanical ability to provide stable frictional support of the object of interest. The number of fingers can also vary to the extent that the geometry of the finger positions project radially and provide balanced support. For example, a fitting element 130 having five fingers will be positioned at the points of an equiangular pentagon wherein the object of interest is disposed at the geometric center. In another example, a fitting element 130 with six fingers may be geometrically equiangular but need not be equiangular if each finger position has a counterpart finger positioned diametrically opposed thereto. One of skill in the art understands that the fingers need only to be positioned such that the normal force imparted on the object of interest is distributed to each finger such that the distributed force to each finger is substantially equal.

In one embodiment as shown in FIGS. 1 and 2, several adjustment levers 105 allow the operator to properly position the casings for scanning. The operator uses a single lever 107 to open the holder's fingers, the casing is inserted, the holder is slid under the light-plate, and a second lever 109 is used to raise the casing firmly into the gel. In another embodiment the casing is raised automatically, for example with a computer and electronic motor system readily known to one of skill in the art. In another embodiment, the process is completely automated.

Figure 4:
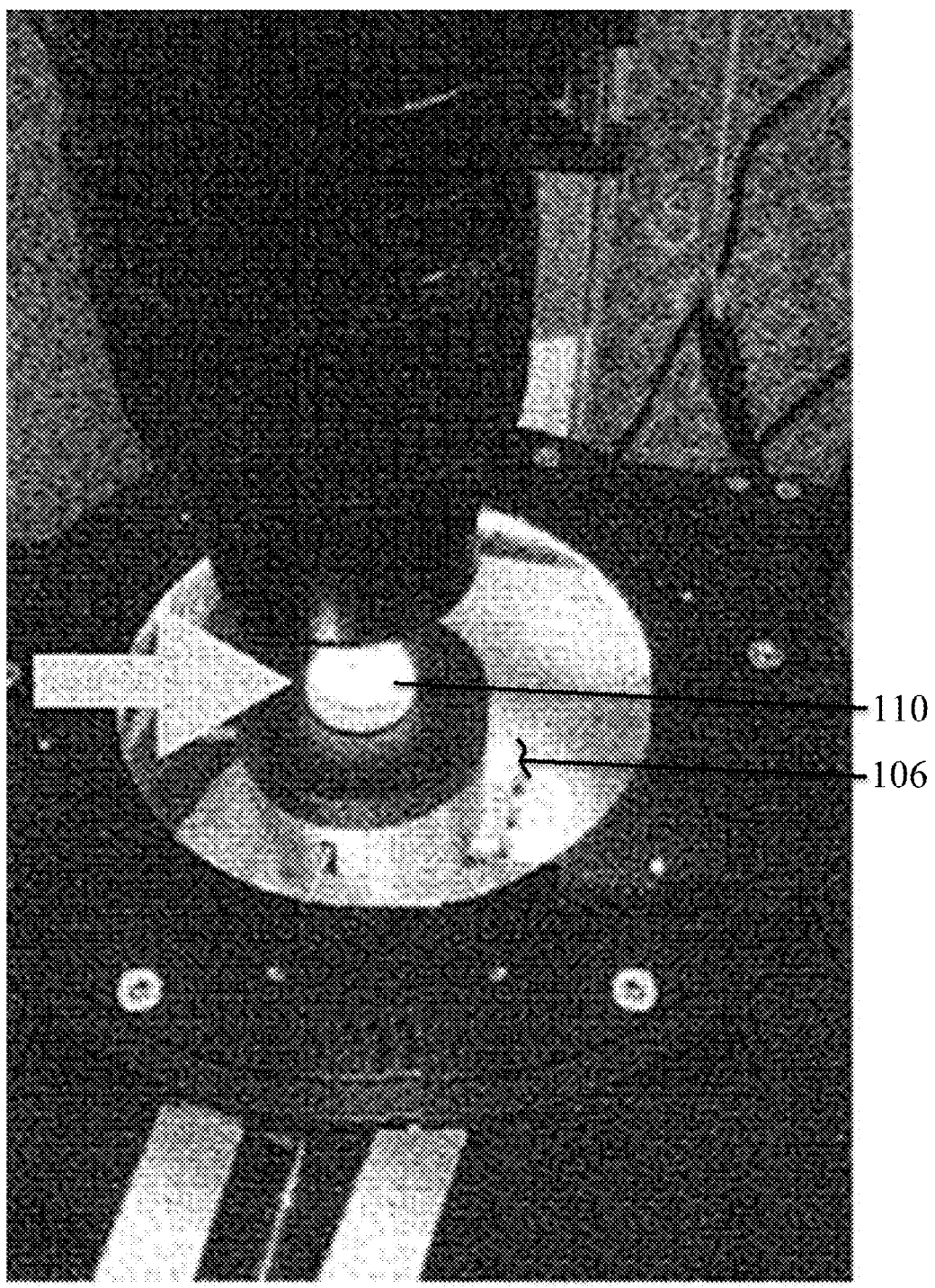
FIG. 4 illustrates the casing raised into the sensor in one embodiment of the imaging and analysis system.

In one embodiment as shown in FIG. 4, a set of lights along the edge of glass plate 106 sequentially illuminates the sensor 110 to reveal an initially shaded image. Calibration images of an object with known 3D geometry, such as a grid of spheres, are used to build a photometric model relating image intensity to surface orientation. Images of the casing 102 pressed into the sensor 110 are collected and converted to surface normals using nonlinear least-squares optimization and into a three-dimensional surface by integration.

Desktop Software Controls the Scanning Process.

Figure 6:
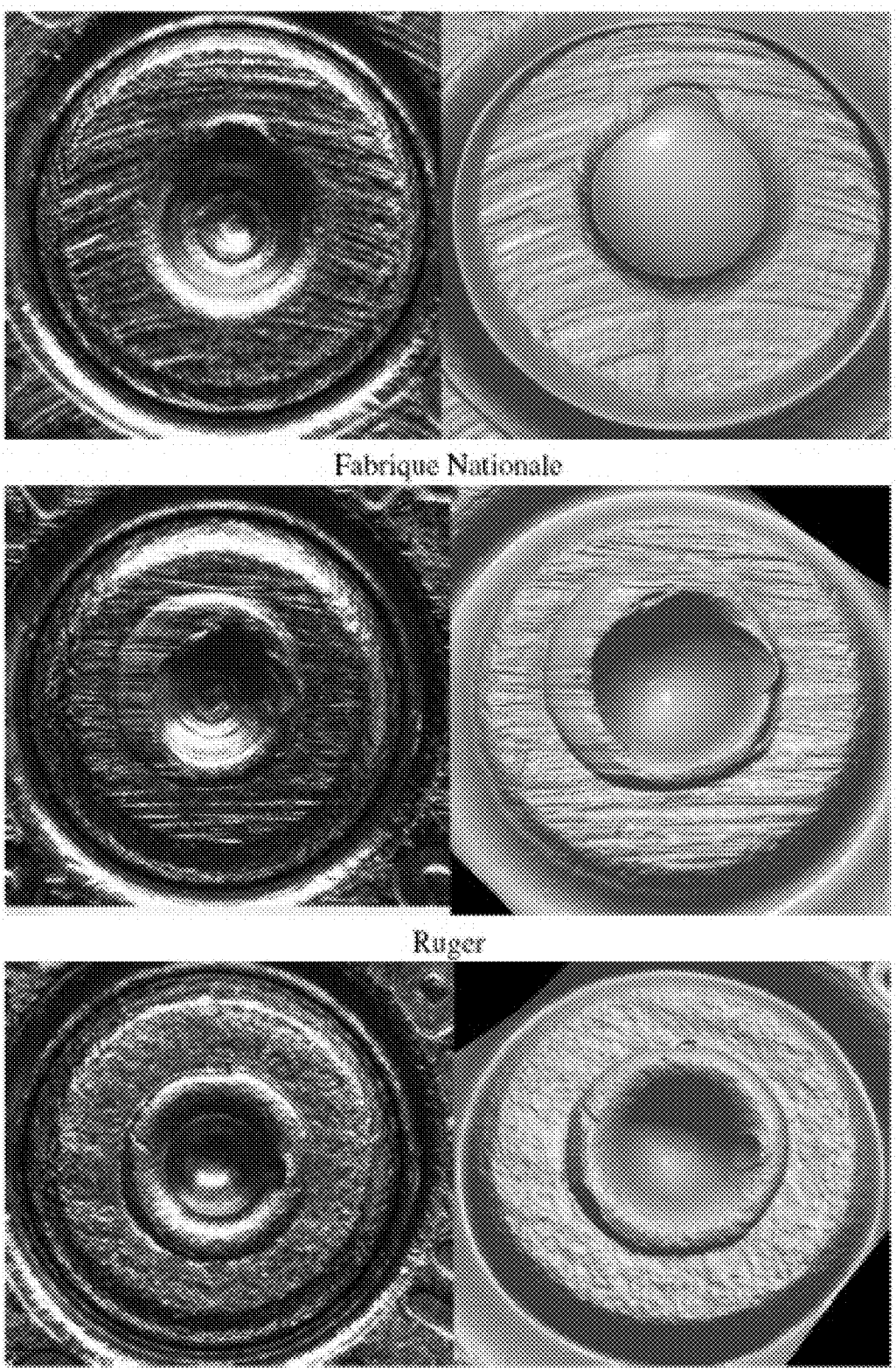
FIG. 6 compares standard light microscopy images (left column) with the images rendered by the analysis and imaging system described herein (right column).

Three representative scans are shown in FIG. 6. In one embodiment, the technology provides an ability to capture surfaces with significant slope. This provides an advantage over confocal microscopy wherein the signal can become unreliable for slopes greater than 15-degrees. For example, scans of a casing with a primer shear laying at a slope of close to 45-degrees may be provide problematic issues with confocal microscopy but does not pose an issue with the inventive embodiments contemplated herein.

Scan Comparison and Matching—Feature-Based Image Matching

The scans have a number of properties that make them amenable to matching using the contemplated method. The matching of cartridge casings with features of known casings, can be thought of as an instance of the general object recognition and matching problem (e.g., looking for bicycles in travel photos). However, several aspects of the cartridge case-matching problem are unique compared to the general object-matching task. For example, the scale of the casing in the image is controlled, the orientation of the objects up to a single in-plane rotation is known, and significant skewing or distortion is substantially reduced or eliminated. Further, because the images describe the 3D shape of the tool marks (i.e., the scans are geometric height-maps), it is not necessary to cope with appearance variations (e.g., shadows) that arise due to variations in lighting conditions, which is a considerable limitation with currently available methods and systems of analysis. Accordingly, currently available methods and systems of analysis fail to provide complete 3D geometric height-maps due to certain "dropped" geometric features resulting from appearance variations such as shadows.

In one embodiment, automatically identified distinctive features are used to match and align features of known casings, a control, with the features of an unknown casing of interest. The score of the match is a function of the number and quality of matched features. By requiring spatial coherence of matched features, the methodology strongly indicates when two casings were fired through the same firearm. In contrast to cross-correlation based methods, feature-based techniques compute the match score using only the portions of the image identified as informative (i.e., the features). Features correspond to regions of the image with nonzero gradients in both the x and y dimensions. They correspond to regions of an image that are well localized and identifiable. That is, they can be reliably found under some expected range of deformations.

Figure 7A:
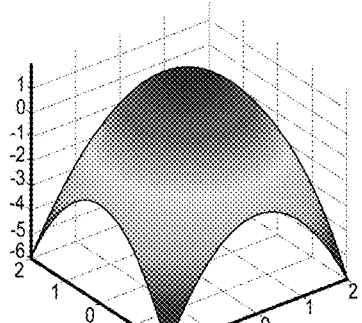
FIG. 7 illustrates the surface gradient characteristics of preferred features (7A-7C) and non-preferred surface features (7D-7E).
Figure 7B:
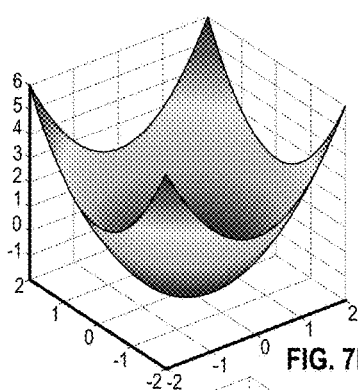
Figure 7C:
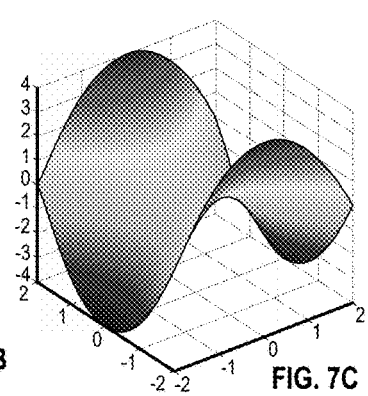
Figure 7D:
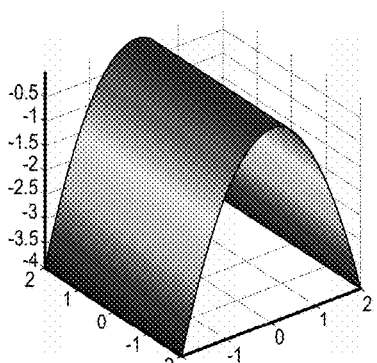
Figure 7E:
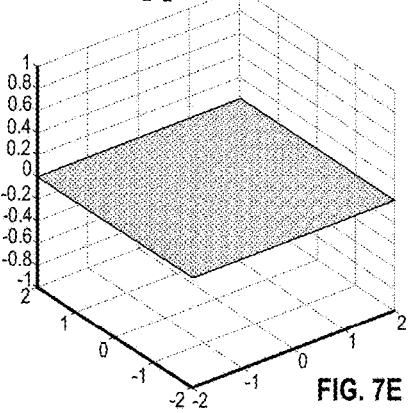

In one embodiment as shown in the Hessian of FIGS. 7A-7C, informative feature points include three dimensional geometric shapes substantially similar to ridges, peaks, gouges, saddle points and concavities that a trained firearms examiner would qualitatively identify. Less informative feature points, as shown in FIGS. 7D-7E, are flat regions or parts of edges, and other similar geometries wherein small changes in position along one or both directions result in very little change of the surface, making it poorly localized. The matching of edges, as represented by FIG. 7D, is handled separately whereby edges are only compared to other edges. To be considered similar, the edges must have similar geometry, position, orientation, and extent In one embodiment, the method includes a step of identifying 'corner-like' depth regions of the surface topography, existing at any size.

In one embodiment, the characterization of these feature points can be determined by a Hessian (the matrix of second derivatives) of the surface, which can be locally classified in terms of its shape. Peaks and saddle points are considered well localizable because these geometries provide a continuously varying slope, whereas edges and plateaus do not have this property and are therefore less desirable. These two instances can be distinguished, by looking at the determinant of the Hessian which is non-zero for peaks and saddle points and zero (or small) for plateaus and edges.

In one embodiment, the system identifies thousands of informative features such as peaks and saddle points at multiple scales. The generalized complex features identified by a human examiner are actually composed of multiple smaller peaks and saddle points that are difficult to differentiate by the human eye; therefore, by matching the peaks and saddle points the contemplated method can improve upon human observed features by distinguishing each of the smaller features, matching each of the smaller features and further quantifying the human observed features. The distinct advantage over previous manual human methods and 2D methods, is that the inventive method provides quantitatively determined mapped geometric features such that the comparison can be objectively compared to actual measurements of the micron-scale features which can provide a basis for numerical scores to objectively rate the quality of the matches. Whereas prior methods of human comparison are based on a qualitative approach due to human limitations in manually measuring micron-scale geometric features. Currently existing manual qualitative approaches are prone to more subjective match assessments and subject to inconsistencies from expert to expert in the examination of casings.

One embodiment of the inventive method of matching two casings identifies a maximal set of self-consistent matched features corresponding to geometric parts of traditional tool marks. A set of matches is considered self-consistent if the matched features of two casings can be spatially aligned after a single rotation and translation of one scan. The score of the match is a function of the number and quality of matched features. In another embodiment, a statistical significance score (i.e., the probability that a match of specified magnitude would occur due to random chance). The statistical scoring function can assign a more interpretable "probability of match" to each pairwise correlation.

In one embodiment, the distribution of the number of matched features for known matches and known non-matches is modeled. From this distribution the probability that a known non-match could generate the specified number of matched features is derived.

In another embodiment, meta-features about the match are extracted. Meta-features include, for instance, the number of matched features, the average difference in feature appearance, differences in feature scale, the size of the masked region, and the overall fraction of the masked region covered by matched features.

In one embodiment, the features of a known casing and the features of a casing of interest are collected contemporaneously.

In one embodiment, the features of known casings are collected and stored in a local computer and readily accessible for matching with features of a casing of interest.

In another embodiment, the features of known casings are collected and stored in a computer that is readily accessible over a local network or the internet for matching with features of a casing of interest.

Scanning Protocol and Software

In one embodiment, each casing is cleaned with isopropyl alcohol and a soft brush prior to scanning. In other embodiments, established protocol for cleaning the casings known in the art can be implemented. For each casing, the breech-face is masked using a developed auto-masking inventive method. The masked region appears in color, as a painted surface, in the 3D viewer. The user can fine-tune the initial mask with the mouse.

Once the scan is acquired, the user is able to view and interact with the 3D surface topography as rendered using the computer's graphics card. The user can zoom, rotate, and pan the rendered surface. Because the model is a true 3D rendering, the user is able to change the position of the light source. This functionality is important for visualization as the direction of the light significantly affects the features visualized. It is important to note that the lighting is only for the user and is not used by the case-matching method. The case-matching method matches the 3D surface topography independent of the light source. The software also allows the firearms examiner to enter casing, firearm, and incident data, conduct database searches (using the feature-based matching inventive method mentioned above), and visualize the matches (with accompanying match score). In one embodiment, the user can save snapshots of the view displayed on the screen, wherein the light, zoom, and position parameters of the snapshot are stored such that the substantially the same snapshot can be reproduced later by entering the light, zoom and position parameters.

The current state of the art groups the true breech-face impression and aperture shear toolmarks together. In one embodiment, the method described does not. In one embodiment, the important information within the aperture shear is contained in the linear striation profile and not in the extruded 3D surface effects of the scraped profile. This is demonstrated in the way firearms examiners currently compare aperture shears. Examiners arrange a split-screen side-by-side view whereby the linear striation profiles are shown side-by-side. In one embodiment, the method analyzes aperture shear which, in combination with the breech-face impression data, accuracy is likely to improve accuracy when aperture shear marks can be properly included.

Heatmapping

Figure 8A:
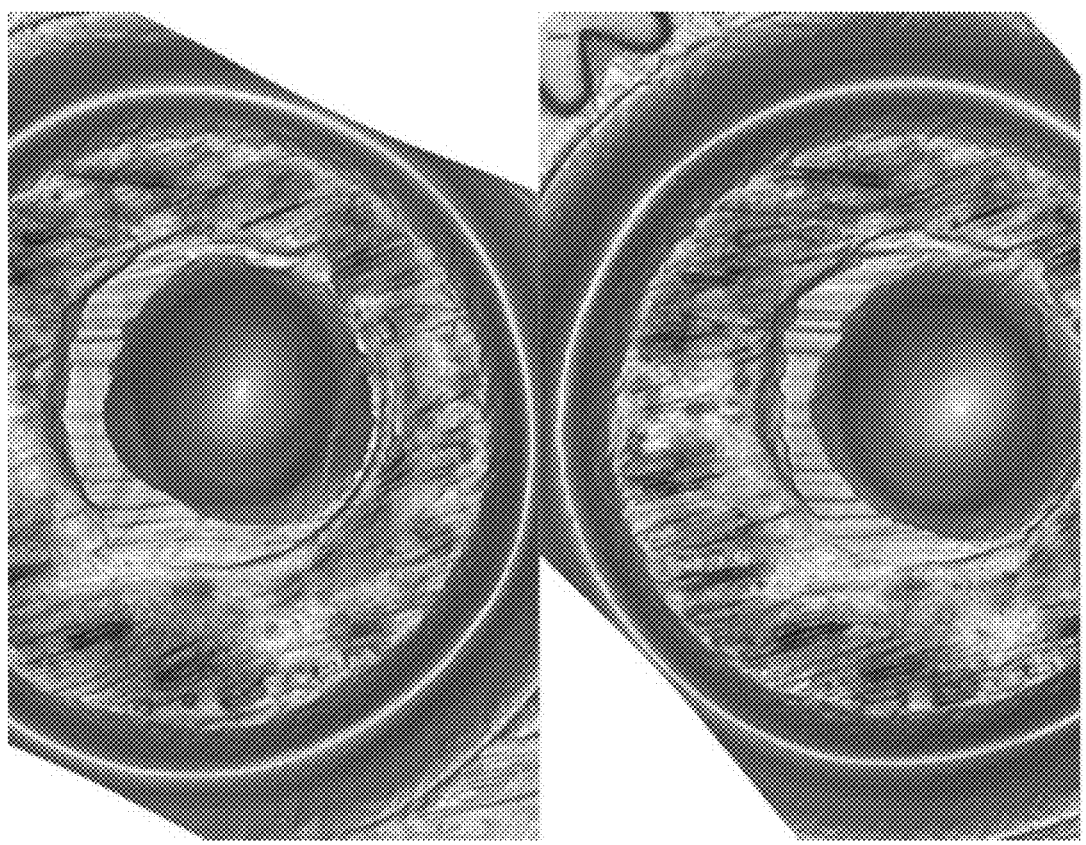
FIG. 8A-8B illustrates the heatmap coloration embodiment that identifies highly similar regions in the matches.
Figure 8B:
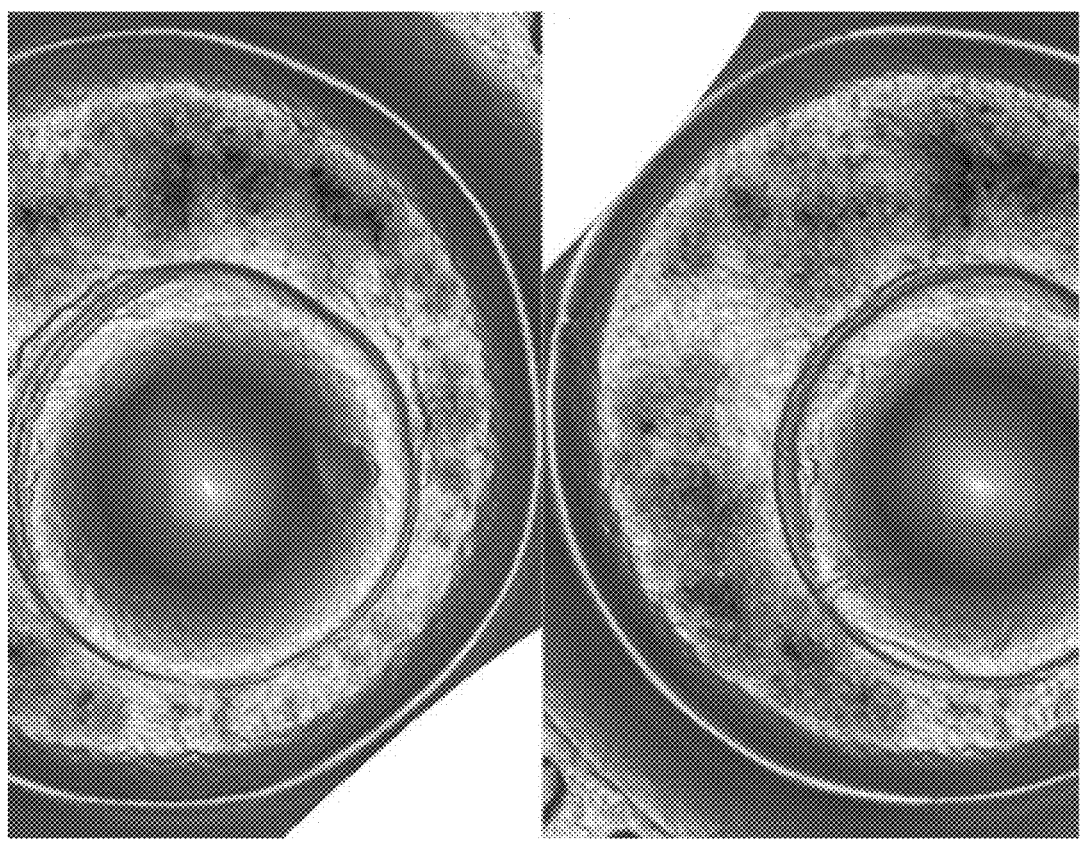

Interpretation of a match identified by any method is inherently difficult. Existing approaches to matching simply provide a match score and do not localize the specific features identified as matching. That is, the matching mechanism provides no explanation as to how the match score was obtained. In one embodiment as shown in FIGS. 8A-8B, identification of matched features would allow an examiner to understand the rational basis of identification. The identification of matched features facilitates presentation of evidence in a courtroom or evidentiary hearing. The identification of matched features explains the basis of the reported match score. The identification of matched features minimizes the risk of confusion.

For a pair of objects in one embodiment as shown in FIGS. 8A-8B, the identification comprises coloration on each surface determined by measuring the density of matched features present at each point of the object's surface and translating the measured density into a color intensity. As shown in FIGS. 8A-8B, the density of matched features is highest where the heatmap color intensity is darkest. Conversely, where the density of matched features is lowest the heatmap color intensity is lightest. And where there are no matched features, there is no color applied to the heatmap. One embodiment also outlines the general area of analysis such that an examiner can distinctly evaluate if the points used as the basis of the match score is a point of interest. This tool allows the examiner to judge whether the provided analysis is consistent and accurate from a practical viewpoint. For example, the examiner may observe an outlier color grouping that is noticeably the result of false positive feature matches. The examiner would then know that the score may be offset. In one embodiment, the examiner may manually modify the match parameters to adjust for such errors to conform to practical standards.

Light Visualization

Manual examination of a topographical system has practical limitations to certain resolutions inherently tied to human limitations. As such, light manipulation during manual analysis at micron and sub-micron resolutions is practically unfeasible. In one embodiment of the current invention the generated 3d structure of a forensics related surface can be visualized through a rendering mechanism. Currently in the related art, it is routine to allow directional lighting when rendering the 3D surface; however, directional lighting as implemented in existing system have only been positioned in discrete locations. That is, the examiner has been unable to position the rendering light at any arbitrary position through a continuously positionable interface element. The user has been restricted to fixed discrete locations. Discrete lighting positions are not desirable for forensics applications as a slight change in light position may manifest as a significant change in visual representation. For example, when visually comparing two or more pieces of evidence precise control over light position is required. Subtle surface features may not be identified as a match if the lighting is not precisely positioned. By positioning the light horizontally, perpendicular to the features the contrast is visually enhanced due to the shadows. This allows both impressed and striated marks to be better interpreted by the examiner.

One embodiment, includes a virtual light-ray source controlled by an interface element for visualizing measured surface features. In one embodiment, the light source allows an examiner to see a measured surface in the same representation as it appears in the real physical world. In one embodiment the control is a continuously positionable element allowing fine grain, continuous, and non-discrete position control over light position. A fine-grain, continuous, and non-discrete positional control avoids the problems of previous approaches. One embodiment, allows precise lighting position and proper comparable visualization of forensics evidence thereby facilitating direct comparison under identical lighting conditions. In one embodiment the continuous positional control of the virtual light-ray source repositions at increments of 0.01°. In another embodiment the continuous positional control of the virtual light source repositions at increments of 0.001°.

In one embodiment, the interface element is a virtual interface element. In one embodiment, the virtual interface element is a virtual trackball. In another embodiment, the interface element is a physical interface element. In yet another embodiment the physical interface element is a physical trackball device.

In one embodiment, the non-discrete position control of the virtual light-ray source provides light repositioning at fine grain (micron) resolutions that previously have been unpractical with manual examination. In one embodiment, the fine-grain is produced at resolutions ranging from about 0.5 microns per pixel to 10 microns per pixel. In a preferred embodiment, the fine-grain is produced at resolutions ranging from about 0.9 to about 1.5 microns per pixel. In particular embodiments, the fine grain is produced at a resolution of 0.9, 1.0, 1.1, 1.2, 1.3, 1.4 or 1.5 microns per pixel.

In one embodiment, a fine-grain, continuous, and non-discrete positional control of the virtual light source specifies the position of the source of the light-rays in the visualization. In one embodiment the specified position can be recorded. In another embodiment, the recorded position may be entered into the imaging and analysis system to reproduce the exact lighting parameters as when recorded.

In one embodiment, moving the virtual control moves the position of the virtual light-ray source. The rendering mechanism displays an image that is a function of the measured 3d geometry and the source of the light rays.

In one embodiment, an image is rendered by reflecting the virtual light rays off the measured 3d surface and into the virtual camera. The rendered image is thus a true representation of the actual surface in the physical world. The creation of a continuously positionable element allows precise control over the source of the light rays and bridges the physical and virtual representation.

In one embodiment, a displayed surface can be modified such that the reflected surface has a color indicating the degree of physical and structural agreement between two pieces of evidence being compared. A region of the surface with no colored shading indicates a lack of structural agreement between the compared objects. A region of the surface with mild colored shading indicates some degree of structural agreement between the compared objects. A region of the surface with strong colored shading indicates a high degree of structural agreement between the compared objects. Coloring can be normalized in a manner to reduce saturation or to focus on particular regions.

3D Printing

The original three dimensional surface topography on the physical evidence being measured is too small to be seen and interpreted by the naked human eye. Measurement with a 3D scanner such as a confocal microscope or a GelSight based system allows visualization of these microscopic surfaces. Of even more use for all individuals is to see and hold a magnified physical form of the surface. In one embodiment, a physical colored surface is significantly more interpretable by both examiners and those not trained in forensics. For example, a physical colored surface can be presented in a courtroom or evidentiary hearing or as an aid to teach examination techniques.

This embodiment of the present invention comprises a machine for taking any measured forensic surface and a 3D printer for creating an enlarged physical manifestation of the surface. In one particular embodiment, the measured surface is enhanced by scaling the measured height to make the measured geometric features more pronounced.

In another embodiment, a measured forensic surface may be printed and colored using the heatmap embodiment described above. The identified feature density may be transferred via colored shading to the surface of the printed material. The colored surface is shaded as described above. The color may be applied during 3D printing or afterwards. In one embodiment, the color may be baked into the printed material. Any 3D forensic object can be printed and shaded this way. In the case of firearms evidence, the surface topography of a bullet or casing may be acquired via a microscopic method (e.g. Confocal microscopy, GelSight retrographic sensor, Photometric stereo, Depth from defocus).

WORKING EXAMPLES

The accuracy of the scanning hardware and software was assessed through a series of experiments. The first two datasets consist of casings randomly selected from two police departments' reference collections. The third dataset represents a small collection of clean, well marked casings. The final set contains the initial real-world dataset and about 100 additional casings scanned by collaborating crime-labs.

Working Example 1

A core set of 9 mm Luger casings was utilized. A total of 101 9 mm Luger firearms from 23 manufacturers were included (Armi Fratelli, Baikal, Beretta, Browning Arms, Bryco Arms, Colt, Hi-Point, Fabrique Nationale, FEG, Heckler & Koch, Intratec, Kahr Arms, Keltec, S&W, Radom, Ruger, Norinco, Sig Sauer, Springfield Armory, Star, Taurus, Uzi, and Walther). At least seven types of ammunition were included (Federal, Fiocchi, PMC, RWS, RP, Speer, Winchester, and Unknown). 431 scans of which 405 had a matching casing within the set was used. Twenty six casings did not have a match. The set represents real-world casings. The firearms were randomly pulled from a reference collection without regard to their ability to produce tool marks. The firearms produce a range of tool marks, filed marks, milled marks and impressed granular marks. Some of the selected firearms did not produce well marked casings. Only the breech-face impression toolmarks were analyzed in this study.

With a match threshold of 0.8 (match score is on a scale of 0-1, with 1 reflecting the strongest match), the Imaging and Analysis system correctly matched 77% of the casings at a 100% success rate. Furthermore, of the other 23% of the casings that failed to meet the 0.8 threshold, no false positives were identified for these or any other casings.

The results demonstrate that using the Imaging and Analysis system was able to identify matches for a significant majority of real-world casings without identifying any false positives. The casings for which a match was not identified are typically poorly marked and are not identifiable by a human examiner using only the breech-face impression toolmarks studied in this experiment.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method of matching toolmarks for firearm forensics comprising:
   pressing an object into a retrographic sensor thereby producing a three dimensional surface of the object;
   illuminating the three dimensional surface with a set of lights;
   capturing at least one image of the three dimensional surface;
   rendering the captured images into a three dimensional image having a resolution ranging from about 0.5 microns per pixel to about 7 microns per pixel;
   measuring the three dimensional image for the geometric features;
   removing the influence of surface reflectivity on the measured three dimensional surface topography;
   comparing the geometric features to known geometric features; and
   providing evaluation of the comparison between the geometric features and known geometric features.

2. The method of claim 1, wherein the object is a cartridge casing.

3. The method of claim 1, wherein the surface is a breech face surface.

4. The method of claim 1, wherein the analyzing step is performed by a computer.

5. The method of claim 4, wherein the geometric features have continuously variable slope.

6. The method of claim 1, further comprising the step of heatmapping the three dimensional image based on the comparison evaluation.

7. The method of claim 1, further comprising the step of 3D printing the three dimensional image.

8. The method of claim 7, further comprising the step of 3D printing the heatmapped three dimensional image.

* * * * *